(12) United States Patent
Ozawa (10) Patent No.: US 6,742,374 B2
(45) Date of Patent: Jun. 1, 2004

(54) METHOD FOR PARTLY REINFORCING A WORKPIECE

(76) Inventor: Masashi Ozawa, 1, Tenno, Takaoka Shin-machi, Toyota City Aichi Pref. (JP)

(*) Notice: Subject to any disclaimer, the term of this patent is extended or adjusted under 35 U.S.C. 154(b) by 0 days.

(21) Appl. No.: 10/078,966

(22) Filed: Feb. 19, 2002

(65) Prior Publication Data

US 2002/0113041 A1 Aug. 22, 2002

(30) Foreign Application Priority Data

Feb. 20, 2001 (JP) ........................................ 2001-043550

(51) Int. Cl.⁷ ................................................ B21D 37/16
(52) U.S. Cl. .................. 72/342.5; 72/342.6; 72/342.54; 72/364
(58) Field of Search ............................ 72/342.1, 342.5, 72/342.6, 342.94, 347, 350, 364, 379.2, 700

(56) References Cited

U.S. PATENT DOCUMENTS

| | | | | |
|---|---|---|---|---|
| 2,396,218 A | * | 3/1946 | Watters | 72/342.1 |
| 3,703,093 A | * | 11/1972 | Komatsu et al. | 72/342.4 |
| 4,290,293 A | * | 9/1981 | Selines | 72/342.1 |
| 4,399,681 A | * | 8/1983 | Hatsuno | 72/342.94 |
| 4,532,793 A | * | 8/1985 | Bezold | 72/350 |
| 5,345,799 A | * | 9/1994 | Miodushevski et al. | 72/342.6 |
| 5,354,522 A | * | 10/1994 | Baartman | 72/342.94 |
| 6,033,499 A | * | 3/2000 | Mitra | 148/688 |
| 6,185,977 B1 | * | 2/2001 | Schiessl et al. | 72/342.1 |
| 6,463,779 B1 | * | 10/2002 | Terziakin | 72/342.56 |

* cited by examiner

Primary Examiner—Ed Tolan
(74) Attorney, Agent, or Firm—Welsh & Katz, Ltd.

(57) ABSTRACT

A method is disclosed for partly reinforcing a workpiece which is capable of reinforcing the reinforcement requiring part of the workpiece on which stress is liable to be concentrated upon use of the workpiece. A workpiece 1 made of metal having a reinforcement requiring part 10 and a forming die 3 are provided. The reinforcement requiring part 10 of the workpiece 1 is heated up to a higher temperature than the other part 18. The reinforcement-requiring part 10 is quenched and reinforced as compared to the other part 18 by bringing the forming surface area of the forming die 3 into direct contact with at least the reinforcement-requiring part 10 of the workpiece 1 which is then strongly pressed.

10 Claims, 7 Drawing Sheets

METHOD FOR PARTLY REINFORCING A WORKPIECE

FIELD OF THE INVENTION

This invention generally relates to a method for partly reinforcing a workpiece and, more particularly, to a method for partly reinforcing a workpiece in which the portion of the workpiece that requires reinforcement is partly reinforced.

BACKGROUND OF THE INVENTION

With reference to a workpiece with a hole and the hardening technique by jetting cooling water as an example, the background of the invention will be explained below. As a manufacturing technique of a workpiece with a hole, there is known a technique including hole-making step of making a hole through a metallic plate workpiece of an ordinary temperature, and forming step of forming the peripheral area of the hole with the forming surface of a forming die into a formed part of cylindrical shape to be carried out successively.

As concerns a plate-shaped workpiece having a reinforcement requiring part on which stress is liable to be concentrated upon use, recently, there becomes also known a technique of partly hardening the reinforcement requiring part by jetting cooling water in the air toward the high-temperature-heated reinforcement requiring part.

Meanwhile, the above-described peripheral area of the hole is a part on which stress is liable to be localized in use. For this reason, in the case of using a workpiece under such circumstances that stress exerted on the peripheral area of the hole becomes excessive, there is possibility that the peripheral area of the hole may be damaged or deteriorated.

On the other hand, according to the technique of partly hardening the reinforcement requiring part of a workpiece by jetting cooling water in the air toward the reinforcement requiring part after heating up to a high temperature, there are limitations as to realizing partial reinforcement exactly on the spot because a lot of cooling water is also jetted on the other part in addition to the reinforcement requiring part. Further, remaining water in the workpiece may induce corrosion of the workpiece and other defects.

BRIEF DESCRIPTION OF THE DRAWINGS

The benefits and advantages of the present invention will become more readily apparent to those of ordinary skill in the relevant art after reviewing the following detailed description and accompanying drawings, wherein:

FIG. 14 is a cross-sectional view of an eighth example of the invention that schematically shows the heating state of a workpiece;

FIG. 15 is a cross-sectional view of an eighth example of the invention that schematically shows the forming state of a workpiece with a forming die concurrently with quenching to reinforce partly the same.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

The present invention has been achieved under such circumstances as described above, and the common purpose of the invention is to provide a method for partly reinforcing a workpiece that can realize partly reinforcing with the forming surface area (part) of a forming die the reinforcement requiring part of the workpiece including the peripheral area of a hole formed through the workpiece on which stress is liable to be focused in use.

A first exemplary method of the invention for partly reinforcing a workpiece including: providing step of providing (preparing) a workpiece made up of a metal substrate having a reinforcement requiring part, and a forming die; heating step of heating the reinforcement requiring part up to a higher temperature than that applied to the other part of the workpiece; and partly reinforcing step of quenching (quench hardening) to reinforce the reinforcement requiring part of a workpiece more effectively than the other part by bringing the forming surface area of the forming die into contact with at least the reinforcement requiring part which is then strongly pressed. These steps are put into practice in order of precedence.

According to the first exemplary method of the invention that is referenced above, the reinforcement requiring part of the workpiece is heated up to a higher temperature than that of the other part in the heating step. As a result, when the reinforcement-requiring part is brought to direct contact with the forming surface area (part) of the die and then strongly pressed in the partly reinforcing step, which constitutes a post-heating step, it is possible to increase the cooling rate of the reinforcement-requiring part as compared to that of the other part of the workpiece. Accordingly, the reinforcement requiring part can be quenched and reinforced more effectively than the other part. In the reinforced part by quenching, increase in one or both of tensile strength and hardness occurs.

A second exemplary method of the invention for partly reinforcing a workpiece including: providing (preparing) step of a workpiece, which is made up of a metal substrate having a reinforcement requiring part, and a forming die having a forming surface area for forming the reinforcement requiring part with a higher workpiece-cooling power than that of the other part; heating step of heating the workpiece up to a high temperature; and partly reinforcing step of quenching (quench hardening) the reinforcement requiring part as compared to the other part by bringing the forming surface area of the die into contact with at least the reinforcement requiring part which is then strongly pressed. These steps are put into practice in this order.

According to the second method of the invention, the forming surface area (i.e., part) of the die has a higher workpiece-cooling power than that of the other part. As a result, the cooling rate of the reinforcement requiring part of the workpiece can be partly increased as compared to the other part in the partly reinforcing step by bringing the forming surface area of the die into direct contact with and then strongly pressing the reinforcement requiring part. Accordingly, the reinforcement requiring part can be quenched and reinforced more effectively than the other part. In the reinforced part by quenching, increase in one or both of tensile strength and hardness occurs.

According to the above-described first and second exemplary methods of the invention for partly reinforcing a workpiece, at least one of the following embodiments, which are embraced in the scope of the invention, can be applied.

The base material of a workpiece is metal. A workpiece prepared by the method of the invention can be those used in, e.g., vehicles of automobile and the like as well as to industrial equipments. Usable metal in the invention includes iron-based material such as carbon steel and alloy steel, but is not limited to these materials, and occasionally may be of titanium-, aluminum-, magnesium-, or cupper-based materials. In case of using iron-based material (generally, steel), high tensile strength steel can be employed preferably as a workpiece material. The shape of a workpiece is not limited particularly. Typical usable workpiece is plate-shaped and includes a reinforcement member sometimes called "Reinforce (member)" for being attached to and reinforcing the body of vehicles and industrial equipments. Usable workpiece may or not have a hole, groove, profiled structure, recess, protrusion and/or the like.

The reinforcement requiring part of the workpiece differs depending on its applications and may be one-dimensional linear part, two-dimensional plane part or three-dimensional part. The reinforcement-requiring part may be at least a part of the outer peripheral area of the workpiece. The reinforcement-requiring part also may be at least a part of the peripheral area of the hole formed through the workpiece. In this case, the reinforcement requiring part corresponds to at least a part of the hole's peripheral area, and operation of forming the hole's peripheral area with the forming surface area of the forming die into a formed part of a wall or flange shape (e.g., cylindrical shape) concurrently with quench-reinforcing of the forming part more than the other part can be applied in the partly reinforcing step.

In case where the workpiece is made of iron-based materials, the reinforcement requiring part is heated up to temperatures of not less than the A1 transformation point to form austenite. On the condition that the workpiece is made of iron-based materials containing alloy elements of high multiplying factor in hardenability (e.g., one or more of carbon, manganese, silicon, nickel, chromium and molybdenum), quench-reinforcing (reinforcement by quenching) is liable to be made effectively.

Exemplary heating means applicable in the heating step include furnaces of continuous and batch types, electric conductors such as coils for high frequency induction heating. Exemplary heating atmospheres include inert gas atmosphere of argon, nitrogen and the like, ambient air atmosphere, reducing atmosphere containing hydrogen, CO or the like, and combustion (exhaust) gas atmosphere. On the condition that high frequency induction heating is employed to the workpiece using a coil for this application or the like, heating time can be extremely shortened to suppress the high-temperature oxidation of the workpiece so that heating may be made in the ambient air atmosphere. In the heating step, heating means for forming a first heating atmosphere of a high temperature and a second heating atmosphere of a relatively lower temperature than that of the first heating atmosphere may be applied. In this case, the reinforcement requiring part of the workpiece can be heated up to a higher temperature than the other part by placing the reinforcement requiring part in the first heating atmosphere and the other part in the second heating atmosphere. The reinforcement requiring part of the workpiece can be heated up to a higher temperature than that applied to the other part also by resistance heating caused by electrical conduction between electrodes through the workpiece under the condition that at least two electrodes are attached to the workpiece. The electric current supplied to the electrodes may be direct or alternating. Exemplary alternating currents include high frequency currents. The frequency of the high frequency currents may be changed according to circumstances.

The term "forming die" is referred to the forming die capable of press-forming a workpiece into any target shape.

Usable forming die may be ones that have upper and lower dies (die members) and a die for burring may be employed. Usable forming part of the forming die for forming the reinforcement requiring part of the workpiece has a constitution of having a higher workpiece-cooling power than that of the other part. Accordingly, this forming unit or units may have a constitution of having cooling means for forcibly cooling the forming part. The forming part also may be made of a material or designed so as to have a higher thermal conductivity than that of the other part.

Quenching the reinforcement-requiring part of the workpiece that has been heated up to a high temperature upon contacting with the forming surface area of the forming die makes it possible to partly reinforce the reinforcement-requiring part. The reinforcement by quenching (i.e., quench-reinforcing) may be caused by micronizing (fining) crystal grains of the metal structure, hardening, or combination thereof. In case of the workpiece of the iron-based material, hardening includes also transformation into troostite, bainite or other metal structure in addition to transformation into martensite. In case of heating the reinforcement requiring part in the heating step followed by quenching, at least one of phenomena such as micronizing (fining) of crystal grain of metal structure, transformation into or generation of martensite, troostite or bainite occur. In general, if the transition rate (speed) at a transformation point of temperature transiting the transformation point from the high temperature side to the low temperature side, i.e., the cooling rate is high, the fining of the crystal grains can be achieved.

It is preferable in the partly reinforcing step to press-form the reinforcement requiring part into a formed part concurrently with quenching to reinforce the reinforcement requiring part. The shape of the formed part is not limited particularly, and may be of a cylindrical wall, U-shaped (or U-shaped with rectangular bottom corners), L-shaped or bent up configuration after lancing, a groove or recess of any profile and shape, or any profiled configuration.

EXAMPLES

Concrete examples of the present invention will be explained below in reference to the accompanying drawings. Some drawing has no hatching line in order to avoid the complication of a view.

1st Example

Figure 1:
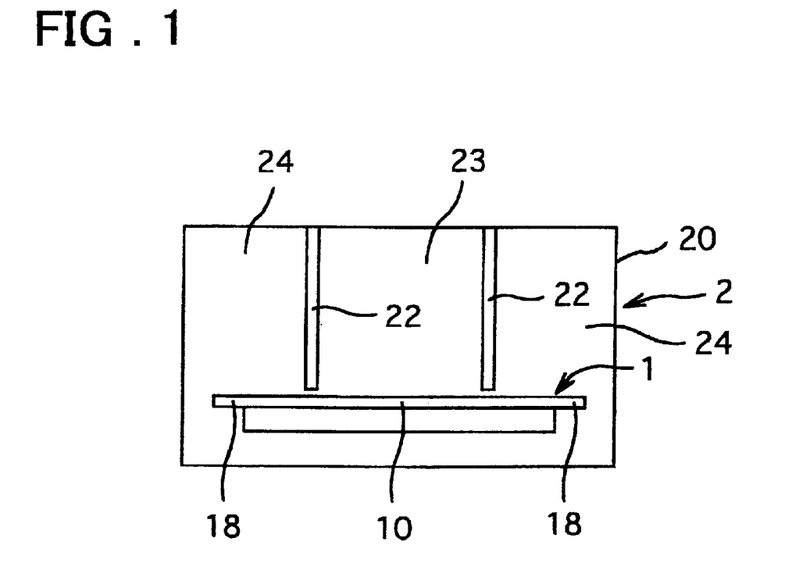
FIG. 1 is a cross-sectional view of a first example of the invention that schematically shows the heating state of a workpiece.

The 1st example embodying the present invention will be explained below in reference to FIGS. 1 and 2. A workpiece 1 used in this example is a substrate made of an iron-based material and has a reinforcement requiring part 10. Heating means used in a heating step is provided with a furnace body 20 having a furnace room and partition walls 22 disposed in the furnace room. The heating atmosphere in the furnace room may be an inert gas atmosphere of argon, nitrogen or the like, ambient air atmosphere, reducing atmosphere containing hydrogen and/or CO, or combustion (exhaust) gas atmosphere according to circumstances. The partition wall 22 is preferably made of a heat insulating material. The partition wall 22 forms a first heating atmosphere 23 of a high temperature and second heating atmosphere 24 of a lower temperature than that of the first heating atmosphere 23. Then, in the heating step, the reinforcement requiring part 10 of the workpiece 1 is heated up to a higher temperature than that of the other part 18 by placing the reinforcement-requiring part in the first heating atmosphere 23 and the other part 18 in the second heating atmosphere 24 as shown in FIG. 1. The heating temperature of the reinforcement requiring part 10 is controlled at a temperature of at least A1 transformation point (e.g., approximately, 750 to 1000° C.) to generate austenite; and that of the other part 18, at less than A1 transformation point (e.g., approximately, 600 to 700° C.) so as substantially not to generate austenite.

Figure 2:
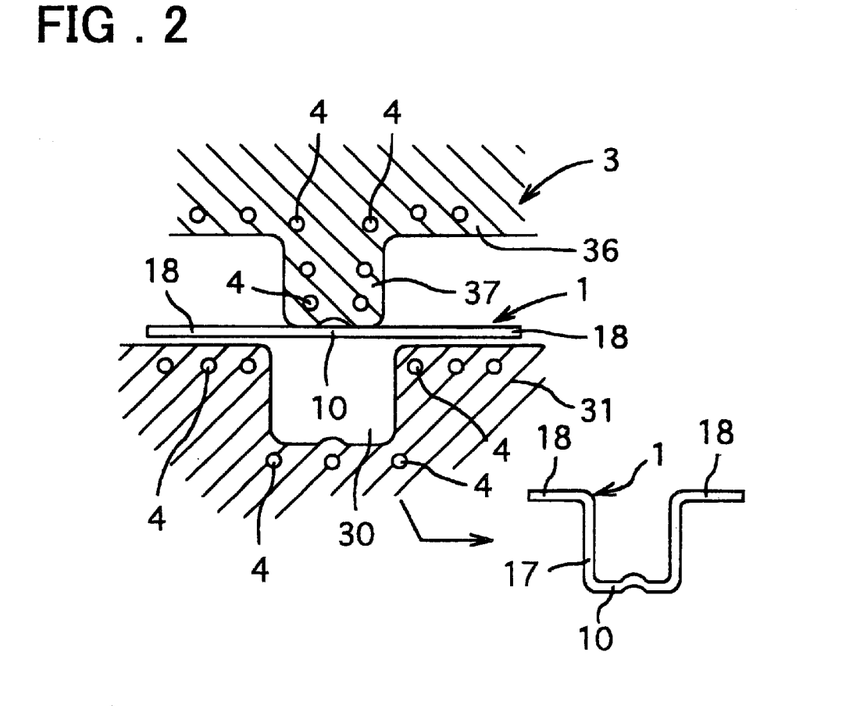
FIG. 2 is a cross-sectional view of a first example of the invention that schematically shows the forming state of a workpiece with a forming die concurrently with quenching to reinforce partly the same.

A forming die assembly (termed "forming die" hereinafter) 3, shown in FIG. 2, for use in a partly reinforcing step is made of a metal such as heat resisting steel and the like, and equipped with a lower die 31 (female die) having a cavity 30 and an upper die 36 (male die) having a punching die part (or punch part) 37 to be inserted in a cavity 30. In the lower die 31 a cooling passage (or passages) 4 is formed as cooling means. In the upper die 36 a cooling passage (or passages) 4 is also formed. Through the cooling passage 4 a cooling medium such as water, mist, air, coolant or the like flows, which makes it possible to forcibly cool the upper die 36 and the lower die 31.

Then, the forming surface area of the upper die 36 and the forming surface area of the lower die 31 are brought into direct contact with the workpiece 1 to press-form the workpiece 1 under the condition that the workpiece 1 is disposed between the upper die 36 and the lower die 31 of the forming die 3 in the partly reinforcing step, i.e., the post-heating step. Particularly, the punching die part 37 of the upper die 36 is pressed into the cavity 30 of the lower die 31. Thereby, the forming surface area of the punching die part 37 and the forming surface area of the lower die 31 corresponding to the cavity 30 become in direct contact with the reinforcement requiring part 10 of the workpiece 1, and the reinforcement requiring part 10 is strongly pressed to die the reinforcement requiring part 10 into a cylindrical formed part 17.

In this case, the cooling rate of the reinforcement-requiring part 10 is higher than that of the other part 18 of the workpiece 1, since the reinforcement requiring part 10 is heated up to a higher temperature than that of the other part 18 in the heating step. Accordingly, the reinforcement-requiring part 10 is quenched and reinforced as compared to the other part 18. Therefore, the formed part 17 of the workpiece 1 formed in the reinforcement requiring part 10 is hardened and reinforced more effectively than the other part 17. Accordingly, even in the case where stress is concentrated on the formed part 17 in using the workpiece 1, the damage and deterioration of the formed part 17 can be suppressed.

In general, the reinforcement effect by quenching of the other part 18 is lower than that of the reinforcement-requiring part 10 notwithstanding the other part 18 was in contact with the forming surface area of the upper and lower dies 36, 31 because a low heating temperature had been applied to the other part 18.

In addition, according to the 1st example of the invention, the reduction in manufacturing steps can be realized and also the reduction in spring back can be expected, because the reinforcement by quenching of the forming part 17 is realized concurrently with press-forming into the formed part 17 of the workpiece 1 in the partly reinforcing step.

2nd Example

Figure 3:
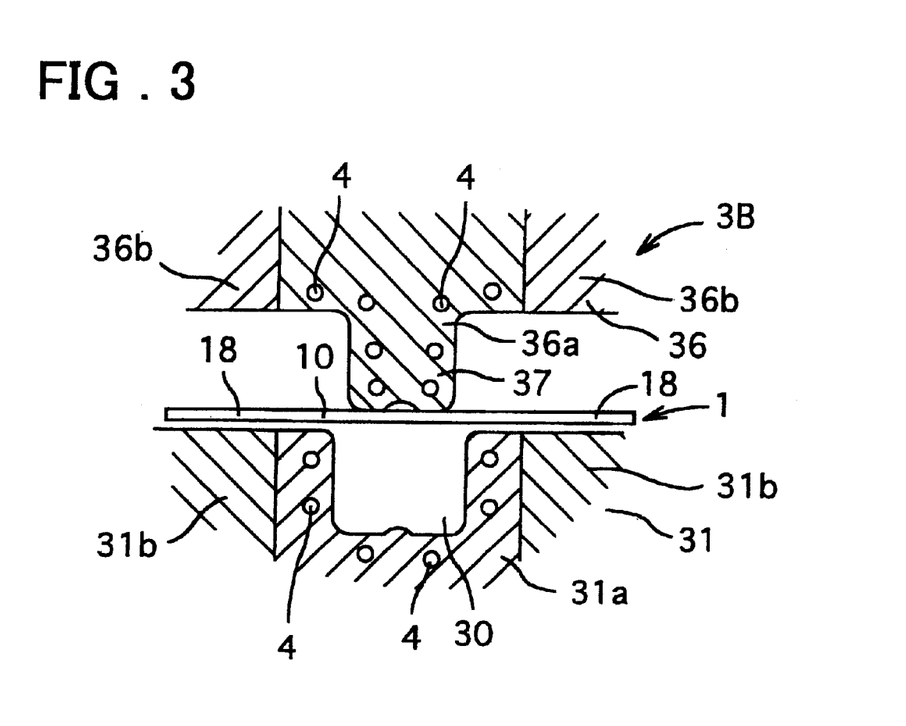
FIG. 3 is a cross-sectional view of a second example of the invention that schematically shows the forming state of a workpiece with a forming die concurrently with quenching to reinforce partly the same.

FIG. 3 shows the 2nd example of the present invention. The constitution, functions and effects of this example are essentially the same with those of the above-described 1st example. Common symbols designated correspond to the elements common to the 1st example. Explanation of this example will be made as follows focusing on the difference from the 1st example. A forming die 3B shown in FIG. 3 is made of a metal such as heat resistant steel and the like, and equipped with a lower die 31 having a cavity 30 and an upper die 36 having a punching die part 37 to be inserted in the cavity 30. The lower die 31 shown in FIG. 3 is equipped with a first lower die 31a having the cavity 30 and a second lower die 31b holding (or receiving) the first lower die 31a. The upper die 36 shown in FIG. 3 is equipped with a first upper die 36a having the punching die part 37 to be inserted in the cavity 30 and a second upper die 36b holding the first upper die 36a. As cooling means a cooling passage (or passages) 4 is formed through the first lower die 31a, but the cooling passage 4 is not formed through the second lower die 31b.

A cooling passage 4 as cooling means is formed through the first upper die 36a, but the cooling passage 4 is not formed through the second upper die 36b. In the cooling passage 4, a cooling medium such as water, mist, air, coolant or the like flows. Accordingly, in the forming die 3B, the first upper die 36a and the first lower die 31a, which constitute a die unit (assembly) used for press-forming the reinforcement requiring part 10 of the workpiece 1, have a higher workpiece-cooling power than that of the second lower and upper dies 31b, 36b which constitute the other unit (or set) of the die. As a result, the cooling rate of the reinforcement requiring part 10 can be made higher than that of the other part 18 of the workpiece 1 in the course of bringing the forming surface areas of the first upper and lower dies 36a, 31a constituting the forming die 3B into direct contact with the reinforcement-requiring part 10 followed by strongly pressing to mold this part.

As described above, according to the present example, the reinforcement requiring part 10 of the workpiece 1 is heated up to a higher temperature than that of the other part (or parts) 18 in the heating step. In addition, the first upper die 36a and the first lower die 31a, both of which are used for press-forming the reinforcement-requiring part 10 in the post-heating step of the partly reinforcing step, has a higher workpiece-cooling power than that of the other unit of the die, i.e., the second lower die 31b and the second upper die 36b. As a result, the cooling rate of the reinforcement requiring part 10 is higher than that of the other part 18. Consequently, the reinforcement requiring part 10 is quenched and reinforced more than the other part 18.

3rd Example

Figure 4:
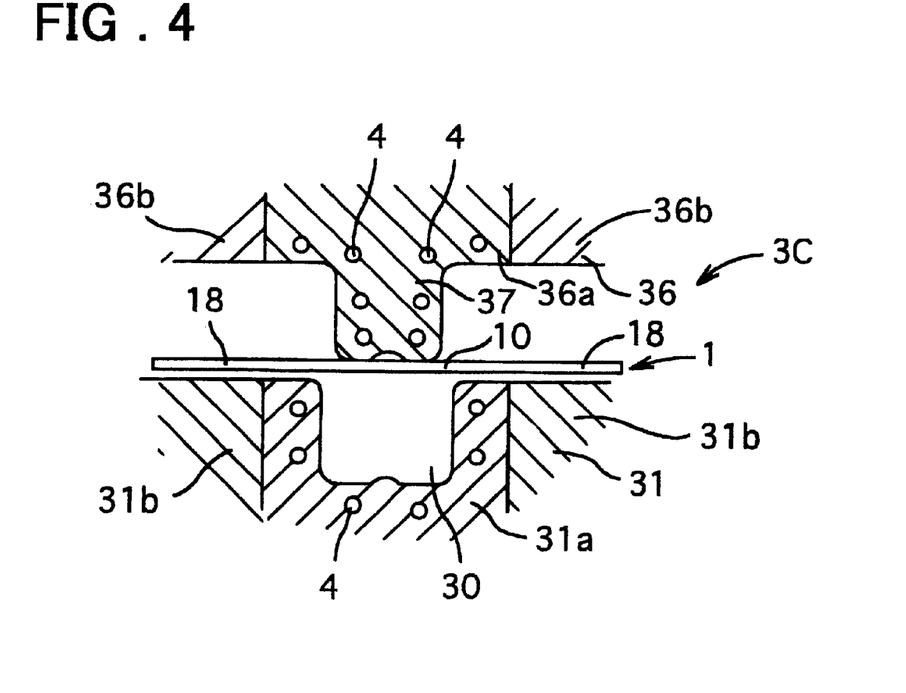
FIG. 4 is a cross-sectional view of a third example of the invention that schematically shows the forming state of a workpiece with a forming die concurrently with quenching to reinforce partly the same.

FIG. 4 shows the 3rd example of the present invention. The constitution, functions and effects of this example are essentially the same with those of the above-described 2nd example. Common symbols designated correspond to the elements common to the 2nd example. Explanation of this example will be made as follows focusing on the difference from the 2nd example. A forming die 3C is made of a metal such as heat resistant steel and the like, and equipped with a lower die 31, which has a cavity 30 and functions as a female die, and upper die 36, which has a punching die part 37 to be inserted in the cavity 30 and functions as a male die.

The first lower die 31a used for press-forming the reinforcement-requiring part 10 of a workpiece 1 is made of a material having a higher thermal conductivity than that of the second lower die 31b. Similarly, the first upper die 36a used for forming the reinforcement-requiring part 10 is made of a material having a higher thermal conductivity than that of the second upper die 36b. In addition, a cooling passage (or passages) 4 as a cooling means is formed through the first lower die 31a, but not formed in the second lower die 31b. The cooling passage (or passages)4 is also formed through the first upper die 36a, but not formed in the second upper die 36b.

Consequently, the first upper die 36a and the first lower die 31a, both of which constitute a die unit of the forming die 3C used for press-forming the reinforcement-requiring part 10, have a higher workpiece-cooling power than that of the second lower and upper dies 31b, 36b which constitute the other unit of the forming die. As a result, when the respective forming surface areas of the first upper and lower dies 36a, 31a included in the forming die 3C are brought into direct contact with the reinforcement-requiring part 10 followed by strongly pressing this part, the cooling rate of the reinforcement requiring part 10 becomes higher than that of the other part 18 of the workpiece 1. Accordingly, the reinforcement-requiring part 10 can be quenched and reinforced more effectively than the other part 18.

4th Example

Figure 5:
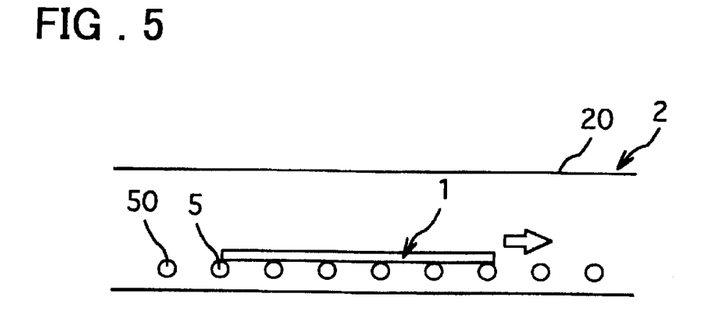
FIG. 5 is a cross-sectional view associated with a 4th example of the invention that schematically shows the heating state of a workpiece.
Figure 6:
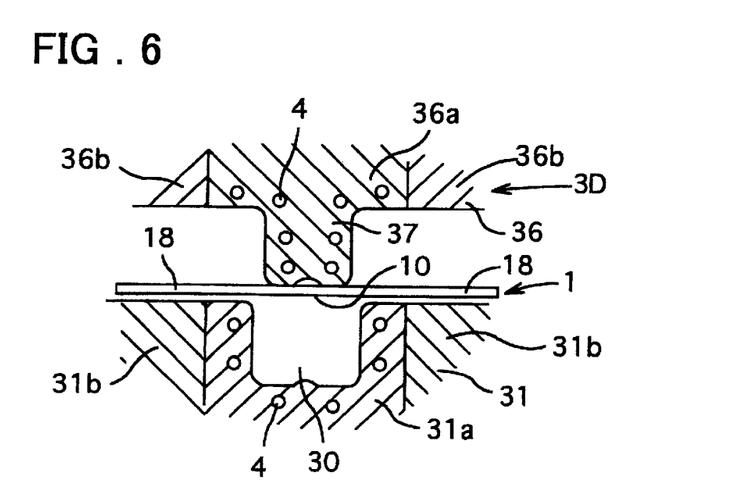
FIG. 6 is a cross-sectional view of a fourth example of the invention that schematically shows the forming state of a workpiece with a forming die concurrently with quenching to reinforce partly the same.

FIGS. 5 and 6 show the 4th example of the present invention. The constitution, functions and effects of this example are essentially the same with those of the above-described 3rd example. Common symbols designated correspond to the elements common to the 3rd example. A heating means 2 applied in a heating step is provided with a furnace body 20 having a furnace room providing a heating atmosphere and a conveying roll system 5 having a number of rotatable carrier rollers 50 functioning as a conveying means. In the heating step, as shown in FIG. 5, a workpiece 1 placed on the conveying roll system 5 is made to pass through the furnace room of the furnace body 20 at a predetermined rate. Thereby the whole workpiece 1 is heated almost uniformly. The heating temperature of the workpiece 1 is determined according to circumstances, but it must be at least A1 transformation temperature (e.g., within a range roughly of 750–1,000° C.).

As shown in FIG. 6, a forming die 3D applied in the partly reinforcing step of the post-heating step is equipped with a lower die 31 having a cavity 30 and an upper die 36 having a punching die part 37 to be inserted in the cavity 30. As shown in FIG. 6, a cooling passage (or passages) 4 as a cooling means is formed through a first lower die 31a, but not formed in a second lower die 31b. The cooling passage (or passages) 4 is also formed through a first upper die 36a, but not in a second upper die 36b.

In addition, the first lower die 31a, which is used for press-forming the reinforcement requiring part 10 of the workpiece 1, is made of a material having a higher thermal conductivity than that of the second lower die 31b according to the invention. Similarly, the first upper die 36a, which is used for press-forming the reinforcement-requiring part 10, is made of a material having a higher thermal conductivity than that of the second upper die 36b. Namely, the first upper die 36a and the first lower die 31a are made of a material having a relatively high thermal conductivity, and the second upper die 36b and the second lower die 31b are made of a material having a relatively low thermal conductivity.

Accordingly, in the forming die 3D, the first upper die 36a and the first lower die 31a, both of which constitute a unit (or set) of the forming die used for forming the reinforcement-requiring part 10, have a higher workpiece-cooling power than that of the second upper and lower dies 36b, 31b which constitute the other unit of the forming die. As a result, in case where the respective forming surface areas of the first upper and lower dies 36a, 31a included in the forming die 3D come into direct contact with the reinforcement requiring part 10 of the workpiece 1 followed by strongly pressing in the partly reinforcing step (i.e., a post-heating step), the cooling rate of the reinforcement-requiring part 10 can be made higher than the other part 18 of the workpiece 1.

As disclosed above, according to the method of this example, the workpiece 1 is overall heated up to a high temperature in the heating step so that the first upper die 36a and the first lower die 31a, both of which constitutes a unit of the forming die 3D for forming the reinforcement requiring part 10 of the workpiece 1, respectively have a higher workpiece-cooling power than that of the second lower and upper dies 31b, 36b which are the other unit of the forming die. As a result, the cooling rate of the reinforcement requiring part 10 becomes higher than that of the other part 18 of the workpiece 1 so that the reinforcement requiring part 10 is quenched and reinforced more effectively than the other part 18.

In general, the other part 18 of the workpiece 1 comes into contact with the respective forming surface areas of the second upper and lower dies 36b, 31b included in the forming die 3D, but, as disclosed above, the workpiece-cooling power of the second upper and lower dies 36b, 31b is relatively lower than that of the first upper and lower dies 36a, 31a so that the quenching and reinforcing effects of the other part 18 are low as compared with those of the reinforcement requiring part 10.

5th Example

Figure 7:
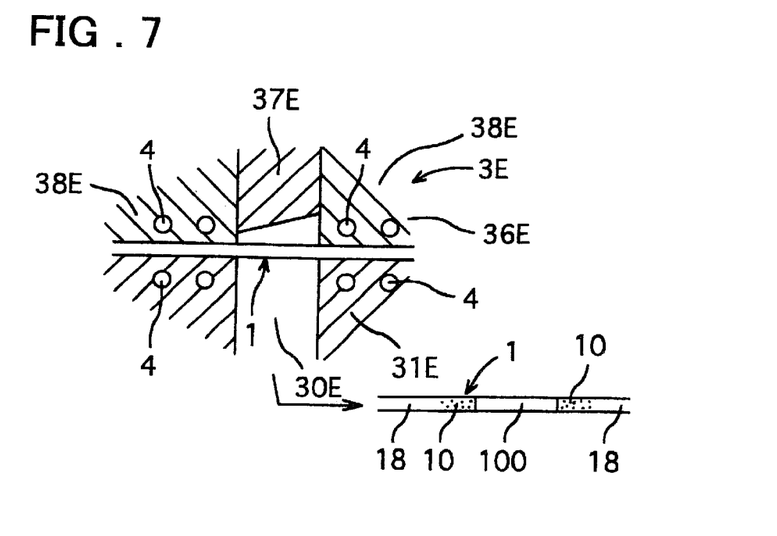
FIG. 7 is a cross-sectional view of a fifth example of the invention that schematically shows the forming state of a workpiece with a forming die concurrently with quenching to reinforce partly the same.

FIG. 7 shows the 5th example of the present invention. The constitution, functions and effects of this example are essentially the same with those of the above-described 1st example. Common symbols designated correspond to the elements common to the 1st example. Explanation of this example will be made as follows focusing on the difference from the 1st example. A forming die 3E is equipped with a lower die 31E having a cavity 30E, an upper die 36E having a punching die part 37E to be inserted in the cavity 30E and a holding mold (or frame) 38E for holding the upper die 36E. The lower die 31E and the holding mold 38E included in the forming die 3E respectively have a cooling passage (or passages) 4 functioning as a cooling means formed therein. Using a workpiece 1 the whole of which has been heated almost uniformly, the upper die 36E and the lower die 31E included in the forming die 3E are made to be put down under the condition that the workpiece 1 is disposed between the upper and lower dies 36E, 31E constituting the forming die 3E. Thereupon, the workpiece 1 is punched by the punching die part 37E to bore a hole 100 instantly after (e.g., after 0.01–1 sec) the workpiece 1 was clamped by the respective forming surface areas of the holding die 38E and of the lower die 31E. In this time, the reinforcement requiring part 10 of the workpiece 1 located in the peripheral area of the hole 100 is brought into direct contact with the forming surface areas of the holding die 38E and of the lower die 31E to be quenched, so that the cooling rate of the reinforcement requiring part 10 corresponding to the circumferential (peripheral) area of the hole 100 becomes higher than that of the other part, and therefor the reinforcement requiring part 10 becomes quenched and reinforced more efficiently than the other part 18.

Generally, stress is liable to be concentrated on the surrounding area of the hole 100 during use of the workpiece 1. However, on the condition that the reinforcement requiring part 10 is located on the peripheral area of the hole 100 made through the workpiece 1 and changed into reinforced one, damage and deterioration can be suppressed.

6th Example

Figure 8:
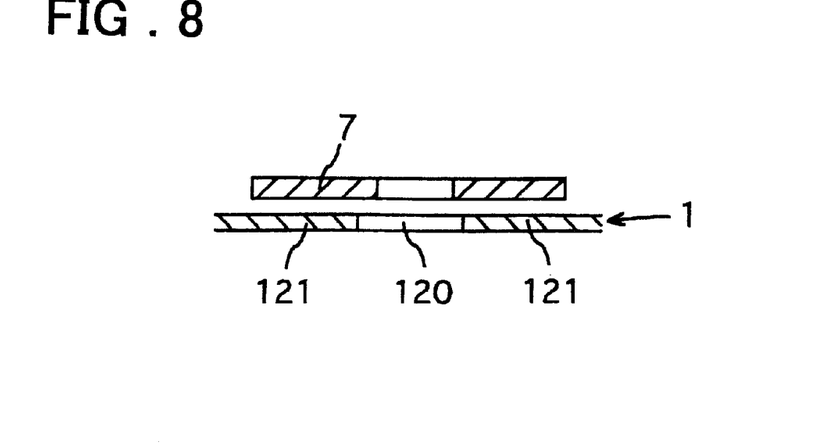
FIG. 8 is a cross-sectional view of a sixth example of the invention that schematically shows the state of applying induction heating to the peripheral area of a hole formed through a workpiece with an electric conductor.
Figure 9:
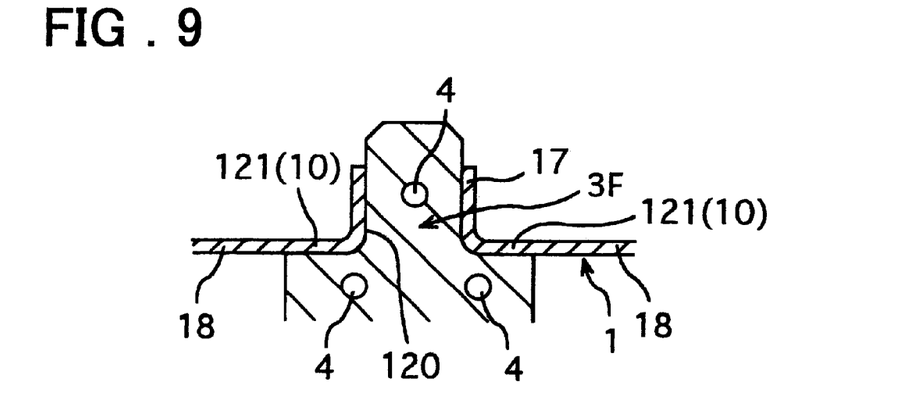
FIG. 9 is a cross-sectional view of a sixth example of the invention that schematically shows the forming state of the peripheral area of a hole formed through a workpiece with a forming die concurrently with quenching to reinforce partly the same.

FIGS. 8 and 9 show the 6th example of the present invention. The constitution, functions and effects of this example are essentially the same with those of the above-described 1st example. Common symbols designated correspond to the elements common to the 1st example. Explanation of this example will be made as follows focusing on the difference from the 1st example. A workpiece 1 is plate-shaped and has a hole 120. In the heating step, an electric conductor 7 such as a coil for induction heating or the like is placed close to the peripheral area 121 of the hole 120, and then a high-frequency current is applied to the conductor 7 to generate an eddy current and make induction heating locally in the peripheral area 121 of the hole 120 made through the workpiece 1. The heating temperature is not less than A1 transformation point (e.g., approximately within a range of 750–1,000° C.). The area of the workpiece 1 except the peripheral area 121 of the hole 120 is not substantially heated.

Then, as shown in FIG. 9, a forming die 3F for manufacturing a burring is pressed into the hole 120 made through the workpiece 1 to make the peripheral area 121 of the hole 121, i.e., a reinforcement requiring part 10 direct contact with the forming die 3F and plastic deformation thereby to form a cylindrical formed part 17. While the cylindrical formed part 17 is being formed in this way, the peripheral area 121 of the hole 120, i.e., the reinforcement requiring part 10 is quenched by the direct contact with the forming surface area of the forming die 3F. Accordingly, press-forming into the formed part 17 can be made concurrently with quenching to reinforce the formed part 17. As a result, the formed part 17 is quenched and reinforced more efficiently than the other part 18. As a cooling means a cooling passage (or passages) 4 is formed through the forming die 3F. In the cooling passage 4 a cooling medium such as water, mist, air, coolant or the like is running to keep the forming die 3F at low temperatures. Thereby, manufacturing a burring can be performed continuously. Although stress is generally liable to be located on the cylindrical formed part 17 of the workpiece contouring a hole 120 in using a workpiece 1, reinforcing the formed part 17 as described above makes it possible to suppress the damage and deterioration of the formed part 17. The workpiece 1 is plate-shaped in this example, but not limited to this one shape, and may be pipe-shaped or box-shaped, or any other shapes desired.

Figure 10:
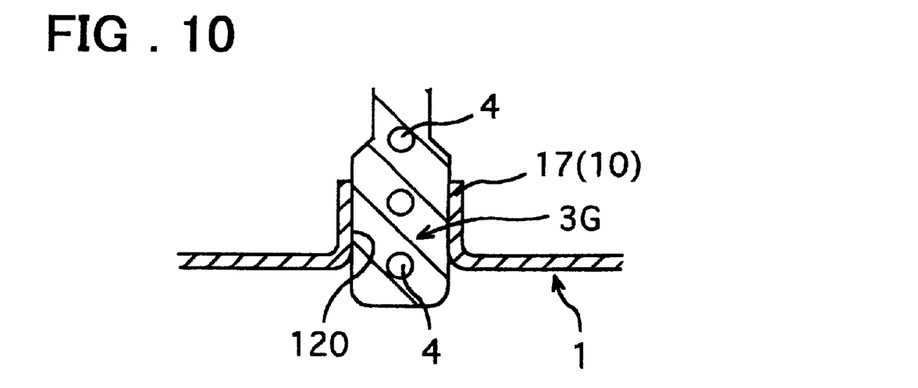
FIG. 10 is a cross-sectional view of a sixth example of the invention that schematically shows the forming state of the peripheral area of a hole formed through a workpiece with a forming die concurrently with quenching to reinforce partly the same.

A cylindrically formed part 17 may be formed in another way as illustrated in FIG. 10 by extracting a forming die 3G for extracting use from a hole 120 to make the formed part 17 for contouring the hole 120 of a workpiece 1, i.e., reinforcement requiring part 10 direct contact with the forming die 3G and plastic deformation thereby. A cooling passage 4, in which a cooling medium such as water, mist, air, coolant or the like runs, is formed through the forming die 3G so that the forming die is kept at low temperatures. Thereby, manufacturing a burring can be performed without cease (i.e., continuously).

7th Example

Figure 11:
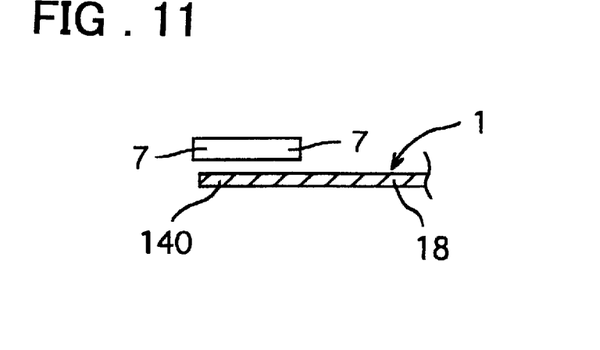
FIG. 11 is a cross-sectional view of a seventh example of the invention that schematically shows the state of applying induction heating to the outer peripheral area of a workpiece with an electric conductor.
Figure 12:
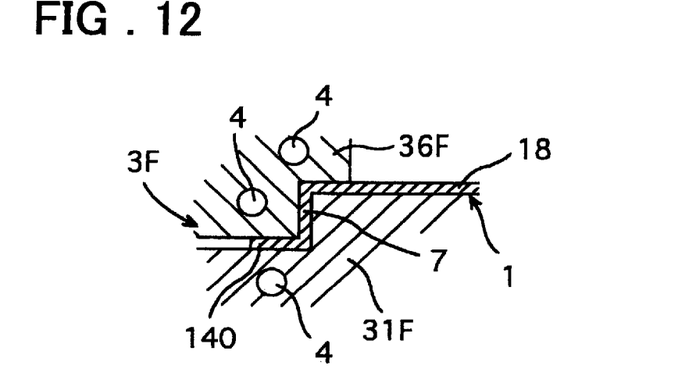
FIG. 12 is a cross-sectional view of a seventh example of the invention that schematically shows the forming state of the outer peripheral area of a workpiece with a forming die concurrently with quenching to reinforce partly the same.

FIGS. 11 and 12 show the 7th example of the present invention. The constitution, functions and effects of this example are essentially the same with those of the above-described 1st example. Common symbols designated correspond to the elements common to the 1st example. Explanation of this example will be made as follows focusing on the difference from the 1st example. As shown in FIG. 11, a workpiece 1 is made of plate-shaped material. In the heating step, an electric conductor 7 such as a coil for induction heating or the like is placed close to the outer peripheral area 140 of the workpiece 1, and a high-frequency current is supplied to the conductor 7 to apply induction heating locally to the outer peripheral area 140. The heating temperature is not less than A1 transformation point (e.g., approximately within a range of 750–1,000° C.). The part 18 of the workpiece 1 other than the outer peripheral area 140 is not substantially heated. Then, using a forming die 3F equipped with a lower die 31F and upper die 36F as shown in FIG. 12, the outer peripheral area 140 kept at the high temperature is brought to direct contact with the respective forming surface areas of the lower and upper dies 31F, 36F and formed into target shape to make a formed part 17 (reinforcement requiring part). In this way, the forming part 17 of the workpiece 1 comes into direct contact with the respective forming surface areas of the lower and upper dies 31F, 36F constituting the forming die 3F to be quenched, so that the formed part 17 is quenched and reinforced more effectively than the other part 18 of the workpiece 1.

8th Example

Figure 13:
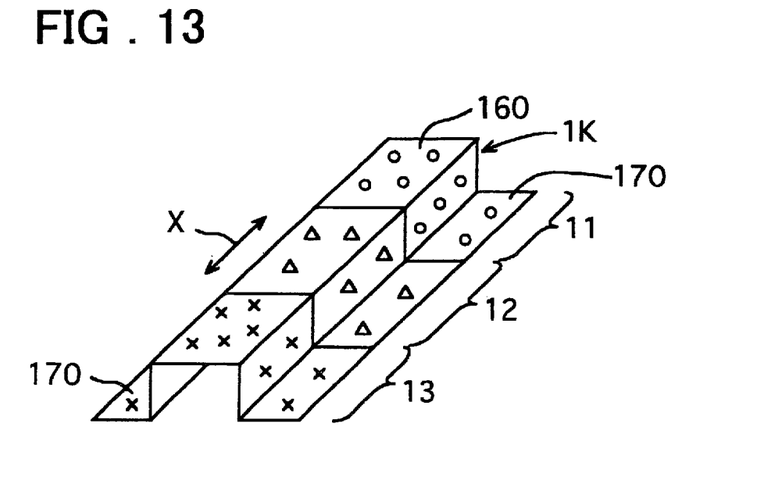
FIG. 13 is a perspective view of an eight example of the invention that schematically shows a workpiece after having been press-formed.

FIGS. 13 to 15 show the 8th example of the present invention. The constitution, functions and effects of this example are essentially the same with those of the above-described 1st example. FIG. 13 shows a workpiece after having been press-formed. As illustrated in FIG. 13, the press-formed workpiece 1K has a generally U-shaped part 160 consisting of one bottom line segment and two parallel line segments intersecting sharply at right angles to the bottom line segment and side flange parts 170 extending outward from both ends of the U-shaped part 160. The central area in the longitudinal direction (indicated by arrow X) of the workpiece 1K is a second reinforcement requiring part 12 which must be endurable to the highest tensile strength (e.g., 1,500 MPa). One terminal area in the longitudinal direction of the workpiece 1K is a first reinforcement requiring part 11 which must be endurable to the next highest tensile strength (e.g., 1,000 MPa). The other terminal area in the longitudinal direction of the workpiece 1K is a third reinforcement requiring part 13 which must be endurable to a relatively low tensile strength (e.g., 800 MPa).

As shown in FIG. 14, a heating means 2K used in a heating step is provided with furnace body 20K having a furnace room and partition walls 22K arranged in the furnace room. The partition walls 22K form a heating atmosphere 23K of a high temperature, a heating atmosphere 24K of a lower temperature than that of the heating atmosphere 23K, and a heating atmosphere 25K of a lower temperature than that of the heating atmosphere 24K.

Then, the second reinforcement requiring part 12 requiring endurance to the highest tensile strength is placed in the heating atmosphere 23K of the highest temperature in a heating step as shown in FIG. 14; the first reinforcement requiring part 11 requiring endurance to the next highest tensile strength, in the heating atmosphere 24K of the second highest temperature; and the third reinforcement requiring part 13 requiring endurance to a tensile strength which is lower than that of the other parts, in the heating atmosphere 25K of a temperature which is relatively low as compared with those of the other parts. In this way, the second reinforcement requiring part 12 for which endurance to the highest tensile strength is necessary is subjected to heating up to a higher temperature than those of the other parts.

In other words, the relationship T2>T1>T3 is established, wherein, with regard to the heating step, the heating temperature of the second reinforcement-requiring part 12 is expressed by T2; the heating temperature of the first reinforcement requiring part 11, T1; and the heating temperature of the third reinforcement requiring part 13, T3. T1, T3 and T2 are not less than A1 transformation point and cause generation of austenite.

A forming die 3K used in this example, which is shown in FIG. 15, is made of a metal such as heat resistant steel or the like, and equipped with a lower die 31K having a cavity and an upper die 36K having a punching die part to be inserted in the cavity. The lower die 31K has a first lower die 31a, second lower die 31b and third lower die 31c. The upper die 36K has a first upper die 36a, second upper die 36b and third upper die 36c.

When the flow rate of a cooling medium, such as cooling water or the like flowing in a cooling passage (or passages) 4K formed through the first lower die 31a, per unit time (e.g., hour) is expressed by V1d, a flow rate through the cooling passage 4K formed in the second lower die 31b is expressed by V2d, and a flow rate through the cooling passage 4K formed in the third lower die 31c is expressed by V3d, the relationship V2d>V1d>V3d is established.

When the flow rate of a cooling medium, such as cooling water or the like running in a cooling passage 4K disposed through the first upper die 36a, per unit time is expressed by V1u, a flow rate through the cooling passage 4K in the second upper die 36b is expressed by V2u, and the flow rate through the cooling passage 4K in the third upper die 36c is expressed by V3u, the relationship V2u>V1u>V3u is established.

In this example, the second upper and lower dies 36b, 31b of the forming die 3K are applied for forming the second reinforcement requiring part 12 having the highest tensile strength in the workpiece 1K and have a largest workpiece-cooling power. The first upper and lower dies 36a, 31a of the forming die 3K are applied for forming the first reinforcement requiring part 11 having the second highest tensile strength in the workpiece 1K and have a middle workpiece-cooling power. The third upper and lower dies 36c, 31c of the forming die 3K are applied for press-forming the third reinforcement requiring part 13 having a lowest tensile strength in the workpiece 1K and have a smallest workpiece-cooling power for cooling the workpiece 1K.

According to the above-described example, the first, second and third reinforcement requiring parts 11, 12, 13 of the workpiece 1K can be quenched and reinforced, respectively. The first reinforcement-requiring part 11 should be quenched and reinforced to a most extent within the entire workpiece 1k. The second reinforcement-requiring part 12 should be quenched and reinforced to a secondary extent within the entire workpiece 1K.

In the heating step of this example, the heating temperature of the workpiece 1K is partly different by part (area) to part. However, this does not represent all cases, and the whole workpiece 1K may be heated almost uniformly up to not less than A1 transformation point depending on the material thereof.

9th Example

Figure 16:
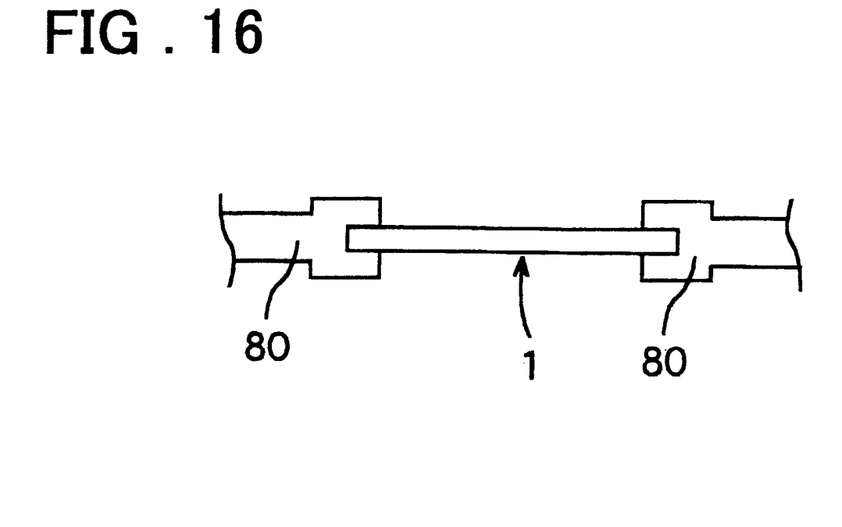
FIG. 16 is a cross-sectional view that schematically shows the state of heating a workpiece by sending electricity to the workpiece while being held by electrodes.

FIG. 16 shows the 9th example of the present invention. The constitution, functions and effects of this example are essentially the same with those of the above-described 1st example. A workpiece 1 can be heated by resistance heating caused by applying a direct current to flow between the electrodes 80 through a workpiece 1 in a heating step under the condition that a plurality (at least one pair) of electrodes 80 made of a conductive material is attached and electrically connected to the workpiece 1. A high-frequency current (alternating current) also may be caused to flow between the electrodes 80 to apply resistance heating to and heat the workpiece 1. In case of applying a high-frequency current to a workpiece 1, in general, the respective terminal surface areas of the workpiece 1 connecting to the electrodes 8 are heated up to higher temperatures. But, in case of applying a direct current to a workpiece 1, the central area of the workpiece 1 between the electrodes 80 is heated up to higher temperatures. If necessary, an electrically conductive layer may be provided on the interface between the workpiece 1 and each of the electrodes 80.

Note

The scope of the invention is not limited to the above-described examples the constitutions of which are respectively illustrated in the accompanying drawings, and the invention may be embodied if necessary in other specific forms without departing from the spirit thereof. All the embodiments and examples disclosed herein may be embraced in the scope of the invention. Of course, the scope of the invention will embrace the combination of the first and second inventive methods for partly reinforcing a workpiece.

Appendant Items

The above disclosure indicates that the following technical features may be grasped embraced in the disclosed scope of the invention.

(Appendant item 1) A method for partly reinforcing a workpiece comprising plural reinforcement-requiring parts different from each other in requisition of reinforcement degree.

(Appendant item 2) The method of the appendant item 1, wherein the relationship CL>CS is established when the workpiece-cooling power of a portion in a forming die for forming a part, which requires relatively high reinforcement, of the workpiece is expressed by CL, and the workpiece-cooling power of another portion in the forming die for forming a part, which requires relatively low reinforcement, of the workpiece is expressed by CS.

(Appendant item 3) The method of the appendant item 2, wherein the workpiece-cooling power CL of the portion for forming the part requiring relatively high reinforcement of the workpiece is obtained by increasing the relative amount per unit time of a cooling medium flowing through a cooling passage disposed in the portion, and the workpiece-cooling power CS of the other portion for forming the part requiring relatively low reinforcement of the workpiece is obtained by decreasing the relative amount per unit time of a cooling medium flowing through a cooling passage disposed in the other portion.

(Appendant item 4) A forming die for forming a workpiece comprising plural reinforcement-requiring parts different from each other in requisition of reinforcement degree, wherein the relationship CL>CS is established when the workpiece-cooling power exhibited by a part of the forming die for forming a part requiring a relatively high reinforcement of the workpiece is expressed by CL, and the workpiece-cooling power exhibited by another part of the forming die for forming a part requiring a relatively low reinforcement of the workpiece is expressed by CS.

(Appendant item 5) A workpiece essentially made of a metal in which at least the peripheral area of a hole formed is partly reinforced more effectively than the other part.

(Appendant item 6) A workpiece essentially made of a metal in which at least the peripheral area of a hole formed is transformed into a hardened layer and partly reinforced more effectively than the other part.

(Appendant item 7) A workpiece essentially made of a metal of which at least the cylindrically formed part forming a wall defining a hole is partly reinforced at a more degree than the other part.

(Appendant item 8) A workpiece essentially made of a metal of which at least the cylindrically formed part forming the wall defining a hole is transformed into a hardened layer and partly reinforced more than the other part.

(Appendant item 9) A workpiece essentially made of a metal of which at least the outer peripheral area is partly reinforced at a more degree than the other part.

(Appendant item 10) A workpiece essentially made of a metal of which at least the outer peripheral area is transformed into a hardened layer and partly reinforced at a more degree than the other part.

In all the above-described appendant items, partly reinforcing a workpiece includes at least one of micronizing (fining) crystal grains contained in the metal structure and hardening. Hardening includes at least one of transformations into martensite, troostite and bainite.

(Appendant item 11) The method of any one of preceding appendant items, wherein heating means used in a heating step includes a furnace body having a furnace room and a partition wall (or walls) partitioning the furnace room, the heating means being partitioned by the partition wall and changing (controlling) the temperature of the room involving the workpiece high and low.

(Appendant item 12) The method of any one of preceding appendant items, wherein the heating temperature of the workpiece is not less than the transformation point. In case of the workpiece being made of an iron-based material (e.g., steel), the heating temperature may be not less than A1 transformation point, or in some case not less than A3 transformation point in order to improve the hardening effect.

The meritorious effects of the present invention are summarized as follows.

According to the first method of the invention for partly reinforcing a workpiece, the reinforcement-requiring part of the workpiece is heated up to a higher temperature than that of the other part in a heating step. As a result, the cooling rate of the reinforcement-requiring part can be increased more than that of the other part by bringing the forming surface area of a forming die into contact with the reinforcement requiring part followed by strongly pressing the reinforcement-requiring part in a partly reinforcing step as the post-heating step. Accordingly, the reinforcement-requiring part of the workpiece can be quenched and reinforced effectively.

According to the second method of the invention for partly reinforcing a workpiece, the forming surface area of a forming die for forming the reinforcement requiring part of the workpiece has a higher workpiece-cooling power than that of the other part. As a result, the cooling rate of the reinforcement requiring part can be increased more effectively than that of the other part by bringing the forming surface area of the die into contact with the reinforcement-requiring part followed by strongly pressing this part. Accordingly, the reinforcement requiring part of the workpiece can be quenched and reinforced effectively.

According to the first and second methods of the invention for partly reinforcing a workpiece, the reduction of manufacturing steps can be realized and also the reduction of spring back can be expected under the condition that press-forming the workpiece into a formed part is carried out concurrently with quenching to reinforce the forming part in a partly reinforcing step.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method for partly reinforcing a workpiece comprising the steps of:
   providing a forming die;
   providing a workpiece that is made up of a metal substrate having a reinforcement requiring part;
   applying heating means for forming a first heating atmosphere having a high temperature and a second heating atmosphere having a relatively lower temperature than the first heating atmosphere;
   placing the reinforcement requiring part in the first heating atmosphere and the other part of the workpiece in the second heating atmosphere, respectively, thereby heating up the reinforcement requiring part to a higher temperature than the other part;
   partly reinforcing the workpiece by bringing a forming surface area of the die into contact with at least the reinforcement requiring part followed by strongly pressing to quench-reinforce the reinforcement requiring part as compared to the other part of the workpiece;
   wherein said means comprises a furnace room and one or more partition walls disposed within said furnace room said one or more partition walls defining said first and second heating atmospheres that are disposed at a first and second temperature, respectively, the first temperature being higher than said second temperature.

2. The method of claim 1, wherein press-forming of the reinforcement requiring part is also carried out in the partly reinforcing step concurrently with the quench-reinforcing of the reinforcement requiring part.

3. The method of claim 1, wherein the first heating atmosphere is heated up to the first temperature by induction heating using an electric conductor.

4. The method of claim 1, wherein the forming surface area of the forming die for forming the reinforcement requiring part has a higher workpiece-cooling power than the other part of the die.

5. The method of claim 1, wherein the reinforcement requiring part is at least a part of a hole's peripheral area of the workpiece.

6. The method of claim 1, wherein the reinforcement requiring part is at least a part of a hole's peripheral area of the workpiece, and in the partly reinforcing step, the peripheral area of the hole is brought into contact with the forming surface area of the die to form a wall-shaped or cylindrically formed part by press-forming concurrently with quench-reinforcing of the formed part more than the other part.

7. The method of claim 1, wherein the reinforcement requiring part is at least a part of the outer peripheral area of the workpiece.

8. The method of claim 1, wherein a forming part of the die for forming the reinforcement requiring part is equipped with cooling means for forcibly cooling the forming part.

9. The method of claim 1, wherein the forming part of the die for forming the reinforcement requiring part is made of material or designed so as to have a higher thermal conductivity than the other part of the forming die.

10. The method of claim 1, wherein the workpiece is made of an iron-based material, and the reinforcement requiring part is heated up to at least A1 transformation temperature.

* * * * *

UNITED STATES PATENT AND TRADEMARK OFFICE
CERTIFICATE OF CORRECTION

PATENT NO.    : 6,742,374 B2
DATED         : June 1, 2004
INVENTOR(S)   : Masahi Ozawa It is certified that error appears in the above-identified patent and that said Letters Patent is hereby corrected as shown below:

Column 15,
Line 29, please insert the word -- and -- after the word "workpiece;"
Line 30, please insert the word -- heating -- after the word "said"
Line 31, please insert a comma after the word "room"

Signed and Sealed this

Thirty-first Day of August, 2004

JON W. DUDAS
*Director of the United States Patent and Trademark Office*